(12) United States Patent
Wyatt et al.

(10) Patent No.: US 6,974,036 B2
(45) Date of Patent: Dec. 13, 2005

(54) CORNER POST AND MANUFACTURING PROCESS FOR MAKING SAME

(75) Inventors: Brendan Wyatt, Shanghai (CN); Barry Kiernan, Shanghai (CN)

(73) Assignee: Viasystems Group, Inc., St. Louis, MO (US)

( * ) Notice: Subject to any disclaimer, the term of this patent is extended or adjusted under 35 U.S.C. 154(b) by 7 days.

(21) Appl. No.: 10/403,226

(22) Filed: Mar. 31, 2003

(65) Prior Publication Data

US 2004/0016713 A1 Jan. 29, 2004

Related U.S. Application Data

(60) Provisional application No. 60/369,215, filed on Apr. 1, 2002.

(51) Int. Cl.$^7$ ................................................. A47F 5/00
(52) U.S. Cl. ......................................... 211/26; 211/189
(58) Field of Search ........................... 211/26, 189, 175, 211/182, 183; 108/180, 182; 312/265.1, 312/265.4, 257.1

(56) References Cited

U.S. PATENT DOCUMENTS

| | | | | |
|---|---|---|---|---|
| 3,620,588 A | | 11/1971 | Ferdinand et al. | .......... 312/323 |
| 4,045,104 A | | 8/1977 | Peterson | .................. 312/257 |
| 4,101,233 A | * | 7/1978 | McConnell | ............... 403/397 |
| 4,201,139 A | * | 5/1980 | Suttles | ....................... 108/109 |
| 4,643,319 A | * | 2/1987 | Debus et al. | ............... 211/189 |
| 4,941,717 A | | 7/1990 | Beaulieu | ..................... 312/265 |
| 4,988,008 A | * | 1/1991 | Blum et al. | ................. 211/189 |
| 4,997,240 A | | 3/1991 | Schmalzl et al. | ........ 312/265.4 |
| 5,014,487 A | * | 5/1991 | King | .......................... 52/731.2 |
| 5,020,866 A | | 6/1991 | McIlwraith | ............... 312/265.4 |
| 5,052,565 A | * | 10/1991 | Zachrei | ....................... 211/182 |
| 5,250,752 A | | 10/1993 | Cutright | .................... 174/35 R |
| 5,333,950 A | * | 8/1994 | Zachrai | .................... 312/265.1 |
| 5,372,262 A | | 12/1994 | Benson et al. | ................. 211/26 |
| 5,380,083 A | | 1/1995 | Jones et al. | ............... 312/265.3 |
| 5,647,650 A | | 7/1997 | Daugherty et al. | ....... 312/265.1 |
| 5,897,180 A | | 4/1999 | Singer | ...................... 312/265.3 |
| 6,120,206 A | | 9/2000 | Benner et al. | ............... 403/231 |
| 6,126,022 A | * | 10/2000 | Merkel | ........................ 211/135 |
| 6,168,249 B1 | | 1/2001 | Chien | ...................... 312/265.4 |
| 6,231,142 B1 | * | 5/2001 | Pochet | ..................... 312/265.3 |
| 6,238,029 B1 | * | 5/2001 | Marzec et al. | ........... 312/265.3 |
| 6,290,072 B1 | * | 9/2001 | Utsumi et al. | ............ 211/41.12 |
| 6,293,637 B1 | * | 9/2001 | Anderson et al. | ........ 312/265.1 |
| 6,502,702 B1 | * | 1/2003 | Hsue et al. | .................... 211/26 |
| 6,504,100 B2 | * | 1/2003 | Lawrence et al. | ........... 174/100 |
| 6,516,955 B1 | * | 2/2003 | Dudhwala et al. | ............ 211/26 |
| 6,719,150 B2 | * | 4/2004 | Marraffa | .................... 211/49.1 |

* cited by examiner

*Primary Examiner*—David Purol
(74) *Attorney, Agent, or Firm*—Dunlap, Codding & Rogers, P.C.

(57) ABSTRACT

A post for a rack. The post is formed of a sheet constructed of a malleable, bendable material. The sheet has a first end and an opposed second end. The first end forms a lower portion of the post and the opposed second end forms an upper portion of the post. The sheet has a first side and an opposed second side with the first and second sides extending generally between the first end and the second end of the sheet. The sheet is formed into a folded box section configuration wherein at least a portion of the first side overlaps a portion of the second side to provide an overlapping portion. The post can be used for forming a European Telecommunications Standards Institute conforming rack.

14 Claims, 4 Drawing Sheets

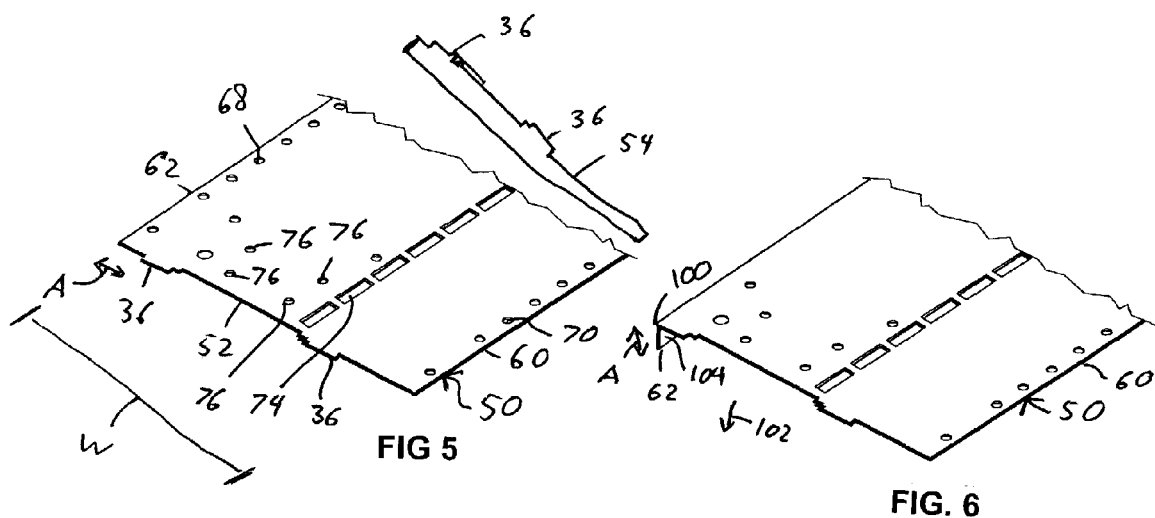
FIG 5
FIG. 6
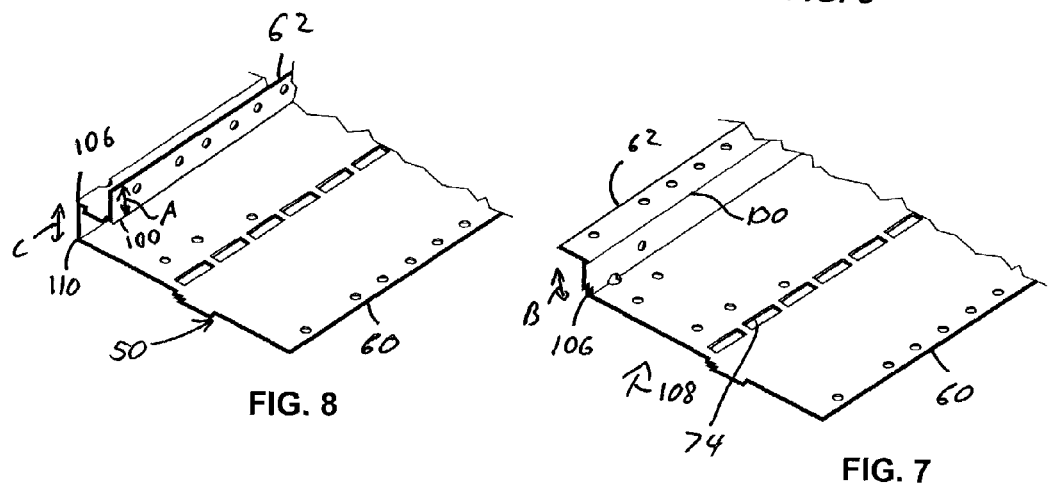
FIG. 8
FIG. 7
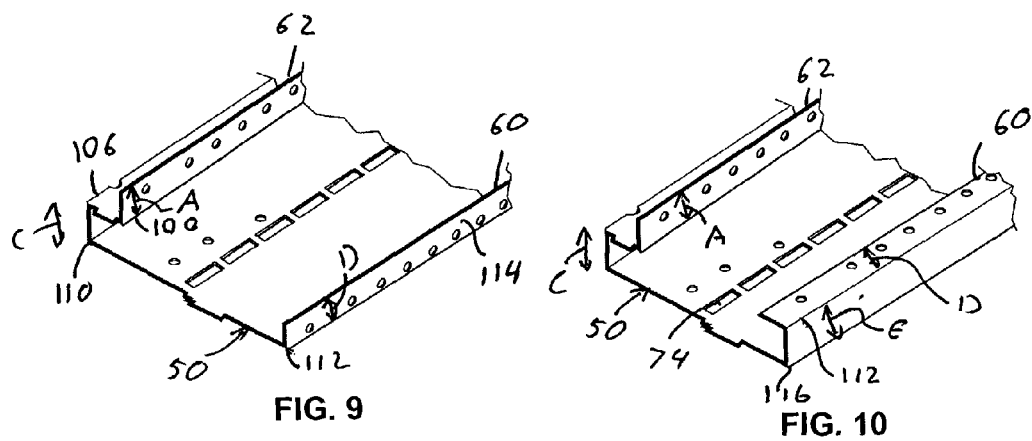
FIG. 9
FIG. 10

CORNER POST AND MANUFACTURING PROCESS FOR MAKING SAME

CROSS-REFERENCE TO RELATED APPLICATIONS

The present application claims priority under 35 U.S.C. § 119 to the provisional patent application identified by U.S. Ser. No. 60/369,215, which was filed on Apr. 1, 2002, the entire content of which is incorporated herein by reference for all purposes.

STATEMENT REGARDING FEDERALLY SPONSORED RESEARCH AND DEVELOPMENT

Not applicable.

BACKGROUND OF THE INVENTION

Standard racks are used for holding rack-mounted electronic equipment, such as servers and telecommunications equipment in a space-efficient configuration. The electronic equipment is configured with flanges for mounting to a rack.

The present invention is generally drawn to a closed steel box section formed from sheet metal and a process to manufacture the closed steel box section. More particularly, the present invention is drawn to a folded, closed steel box section and manufacturing process for a corner post of an equipment rack.

In a preferred embodiment, the present invention is drawn to a folded box section and manufacturing process for a corner post for a European Telecommunications Standards Institute (ETSI) conforming equipment rack, and a standard rack design based on the folded box section corner post construction and locations.

BRIEF SUMMARY OF THE INVENTION

It is an object of the present invention to provide a closed steel box section and manufacturing process for a corner post of an equipment rack through folding of sheet metal, without any welding.

It is another object of the invention to provide a folded, closed steel box section and manufacturing process for a corner post having an equipment rack that weighs approximately thirty percent less than prior art designs.

It is a further object of the invention to provide a folded, closed steel box section and manufacturing process for a corner post of an equipment rack that costs approximately thirty percent less than prior art designs.

It is yet another object of the invention to provide an ETSI standard rack using the folded, closed steel box section and manufacturing process for a corner post.

It is another object of the invention to provide an ETSI standard rack using sheet metal frame components manufactured using hard pressed tooling.

It is a further object of the invention to provide a folded, closed steel box section and manufacturing process for a corner post of an equipment rack that provides a very stable construction and a precise fit.

It is yet another object of the invention to provide an ETSI standard rack that can be shipped unassembled and easily assembled on site where the electronic components are to be installed.

It is yet another object of the invention to provide an ETSI standard rack that can be shipped as a "flat pack" that greatly reduces bulk and, thus, shipping costs.

BRIEF DESCRIPTION OF THE SEVERAL VIEWS OF THE DRAWINGS

FIGS. 5–10 are perspective views illustrating sequential steps in forming the post depicted in FIG. 4.

DETAILED DESCRIPTION OF THE INVENTION

Figure 1:
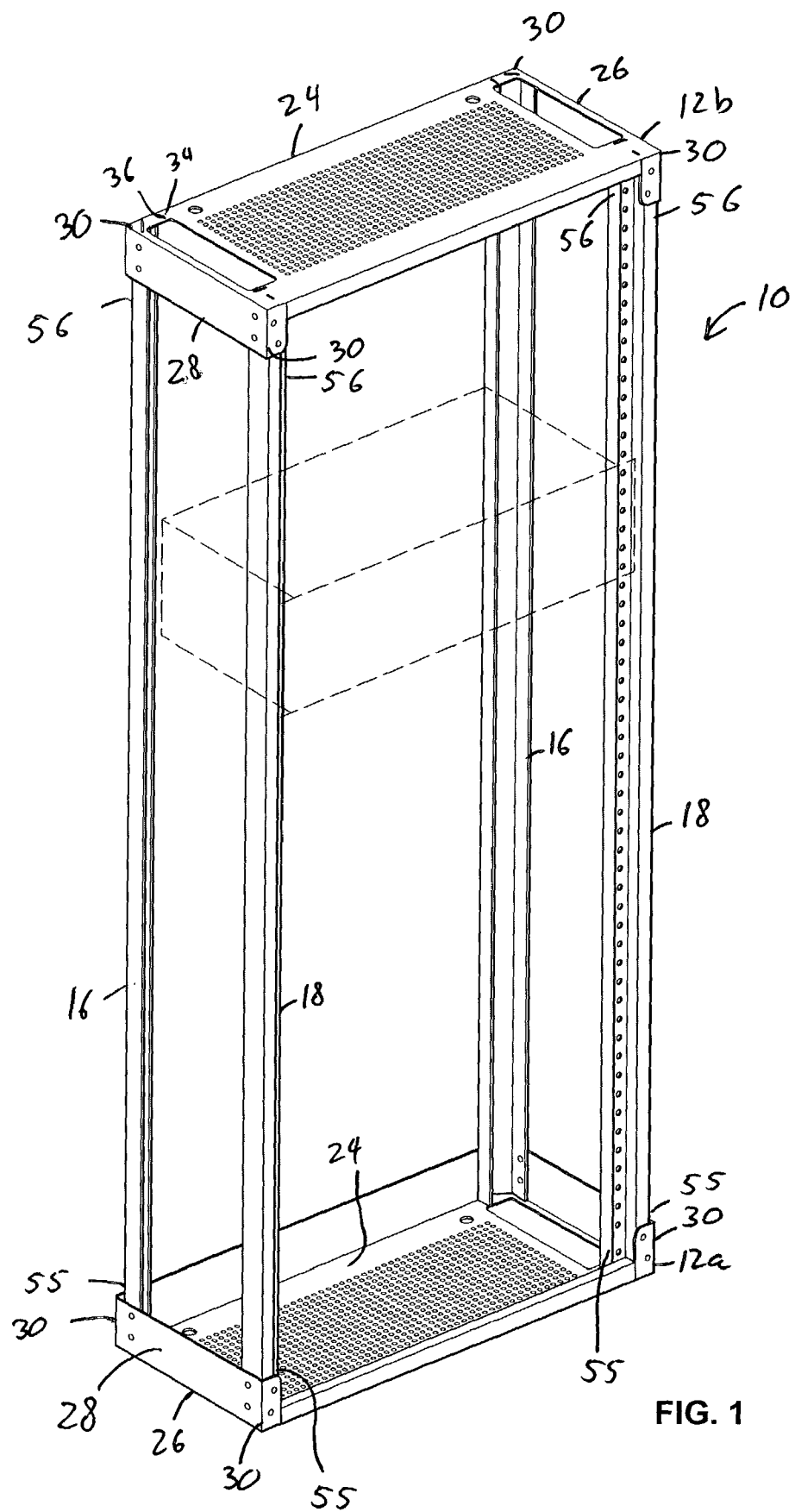
FIG. 1 is a perspective view of a rack or cabinet constructed in accordance with the present invention.

Referring now to the drawings, and more particularly to FIG. 1, shown therein and designated by reference numeral 10 is a rack or cabinet constructed in accordance with the present invention. The rack 10 is typically used for supporting or holding electronic equipment. In one preferred embodiment, the rack 10 is designed as a European Telecommunication Standards Institute (ETSI) conforming equipment rack. In general, the rack 10 is provided with a lower panel 12a and an upper panel 12b. In one preferred embodiment, the lower panel 12a and the upper panel 12b are identical in construction and function. For this reason, when describing the construction of the lower panel 12a or the upper panel 12b, such panels will simply be referred to as the "panel 12".

The rack 10 is also provided with one or more posts 16, and one or more posts 18. The rack 10 will be described hereinafter as the European Telecommunication Standards Institute conforming equipment rack wherein the lower and upper panels 12a and 12b have a rectangular shape, and the posts 16 are characterized as "rear posts", and the posts 18 are characterized as "front posts". However, it should be understood that the rack 10 does not have to be a European Telecommunication Standards Institute conforming equipment rack and, in such case, the lower and upper panels 12a and 12b can be formed of any geometric, asymmetric, or fanciful shape. Further, the posts 16 and 18 can be positioned on any location with respect to the lower panel and upper panels 12a and 12b.

The lower and upper panels 12a and 12b are horizontally disposed and parallel to each other. Each of the panels 12 is provided with a horizontal wall 24 having an outer peripheral edge 26. The panel 12 is also provided with at least one, and preferably a plurality of vertical walls 28 that form four corners 30. A plurality of slots 34 are formed in the horizontal wall 24 for receiving complimentary tabs 36 formed on an end of the posts 16 and 18.

The corner posts 16 and 18 are typically of equal length and have the tabs 36 on each end, which are complimentary to the slots 34 formed in the horizontal wall 24 of the lower and upper panels 12a and 12b. The rear posts 16 are precisely located with respect to the lower and upper panels 12a and 12b by the tabs 36 and are rigidly connected to the lower and upper panels 12a and 12b as will be described in more detail below.

The front posts 18 are also precisely located with respect to the lower and upper panels 12a and 12b via the tabs 36 and slots 34. The posts 18 are rigidly connected to the lower and upper panels 12a and 12b as will be described in more detail below.

Figure 2:
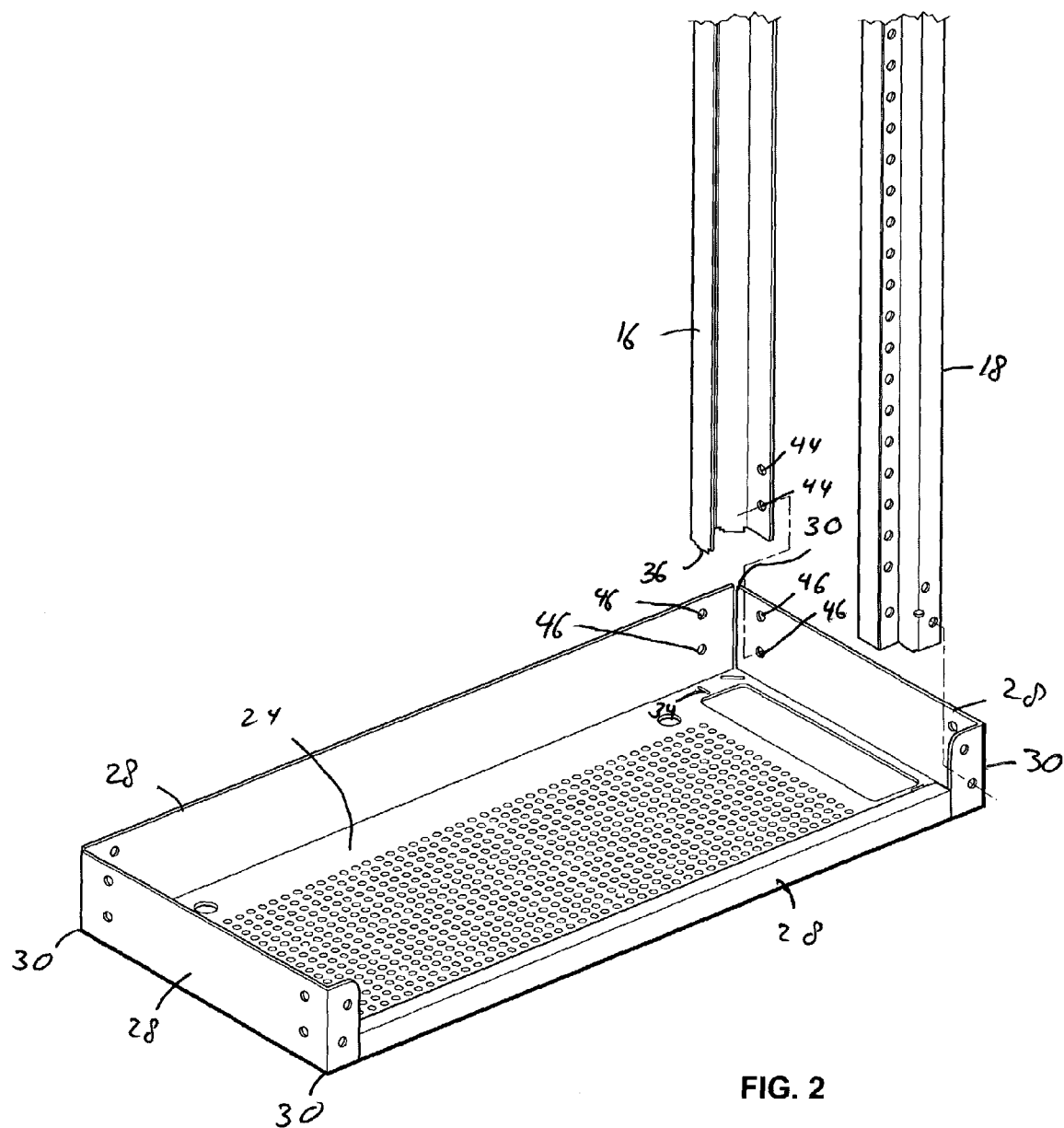
FIG. 2 is an exploded view illustrating the connection of a front post and a rear post to a base frame in accordance with the present invention.
Figure 3:
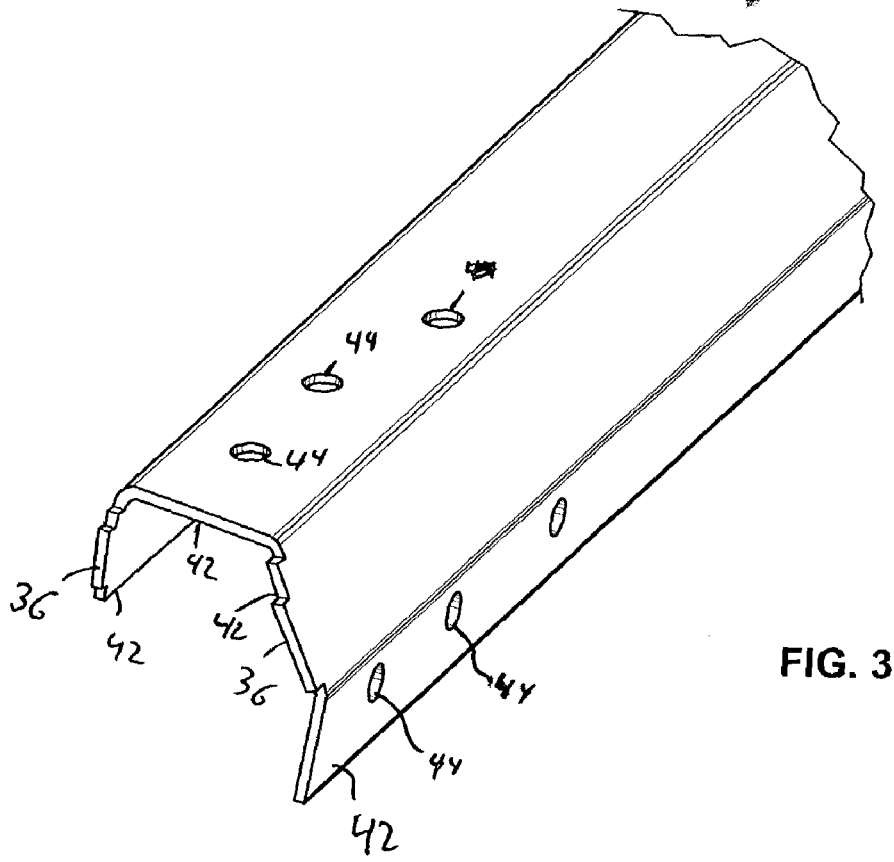
FIG. 3 is perspective view of a post constructed in accordance with the present invention.
Figure 1:
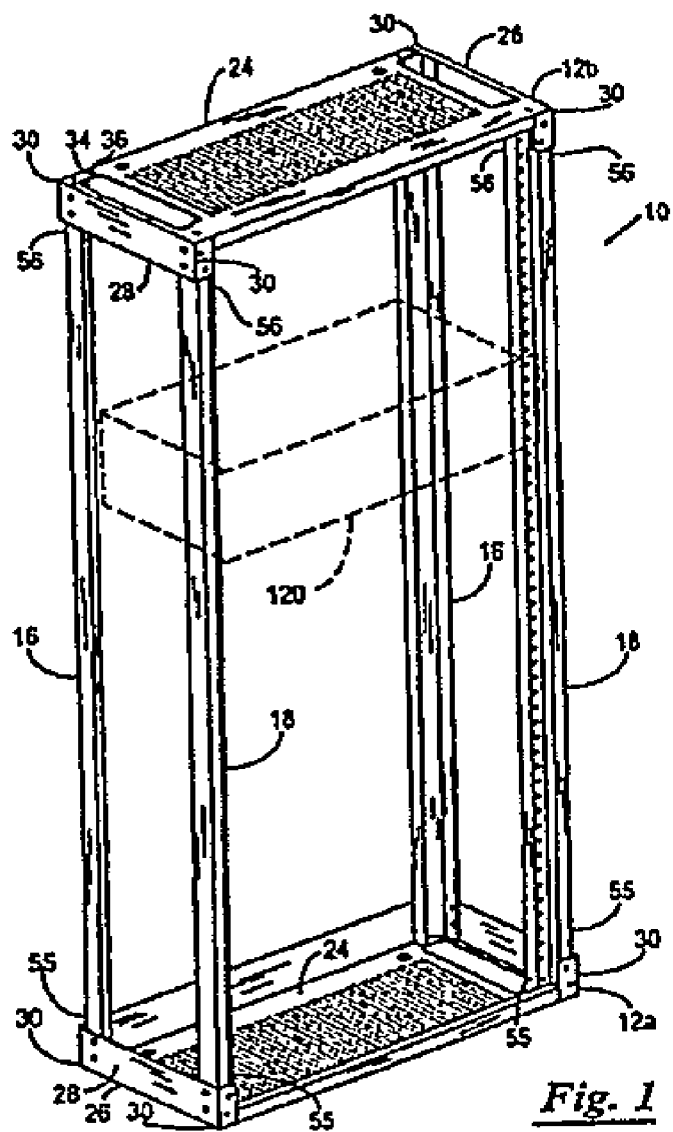
Figure 2:
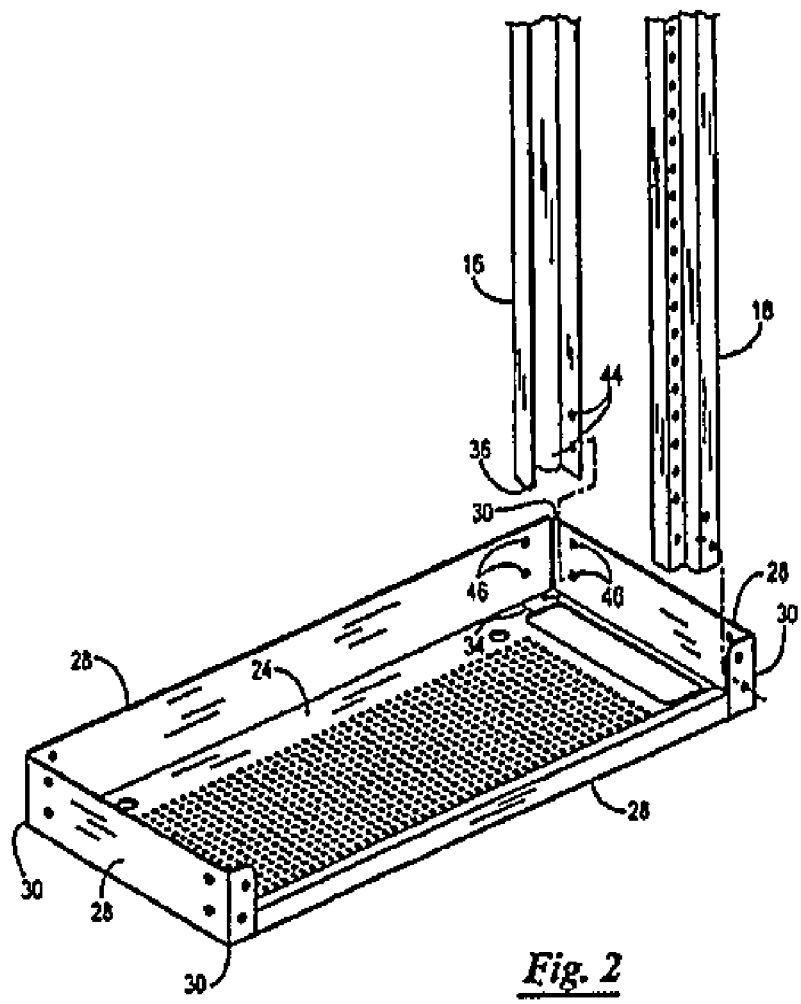
Figure 3:
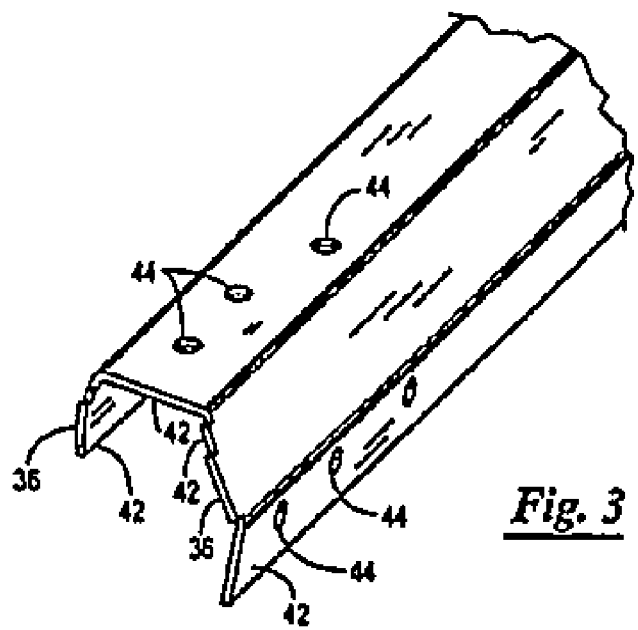
Figure 4:
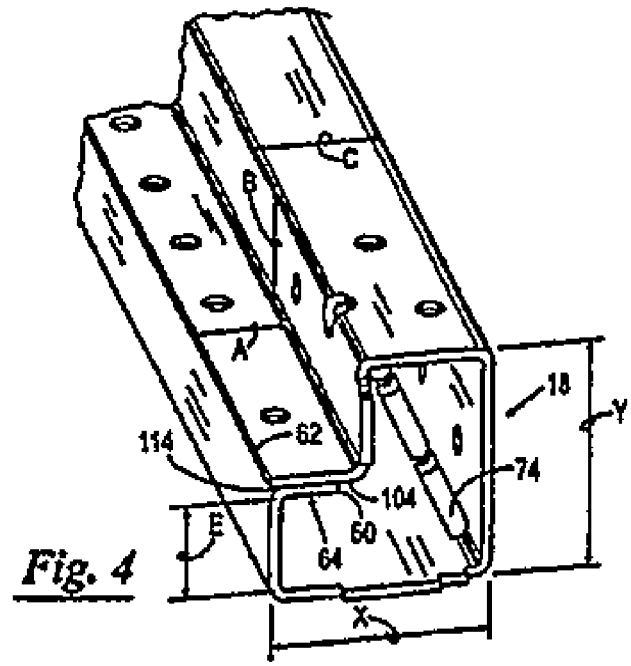

Referring now to FIG. 3, shown therein is a fragmental, perspective view of the post 16. The post 16 is constructed of a malleable, bendable material. The post 16 is preferably constructed of a sheet bent into a U-shape substantially corresponding to that shown in FIG. 3. The post 16 is provided with one or more wall sections 42 with four wall sections 42 being shown by way of example. To connect the post 16 to the lower and upper panels 12a and 12b, a plurality of openings 44 are provided through the wall sections 42 to receive corresponding fastening devices, such as bolts or screws. When the post 16 is to be used in an application where the post 16 forms a corner post of a rectangular rack, the openings 44 are typically formed through the wall sections 42 which mate adjacent to portions of the vertical walls 28 of the lower and upper panels 12a and 12b. For example, corresponding openings 46 (FIG. 2) are formed through the vertical walls 28 so that upon placement of the post 16 adjacent the corner 30 of the lower panel 12a or the upper panel 12b, the openings 44 and 46 are aligned so that the fastening device can be inserted there through for connecting the post 16 to the lower or upper panel 12a or 12b.

Figure 4:
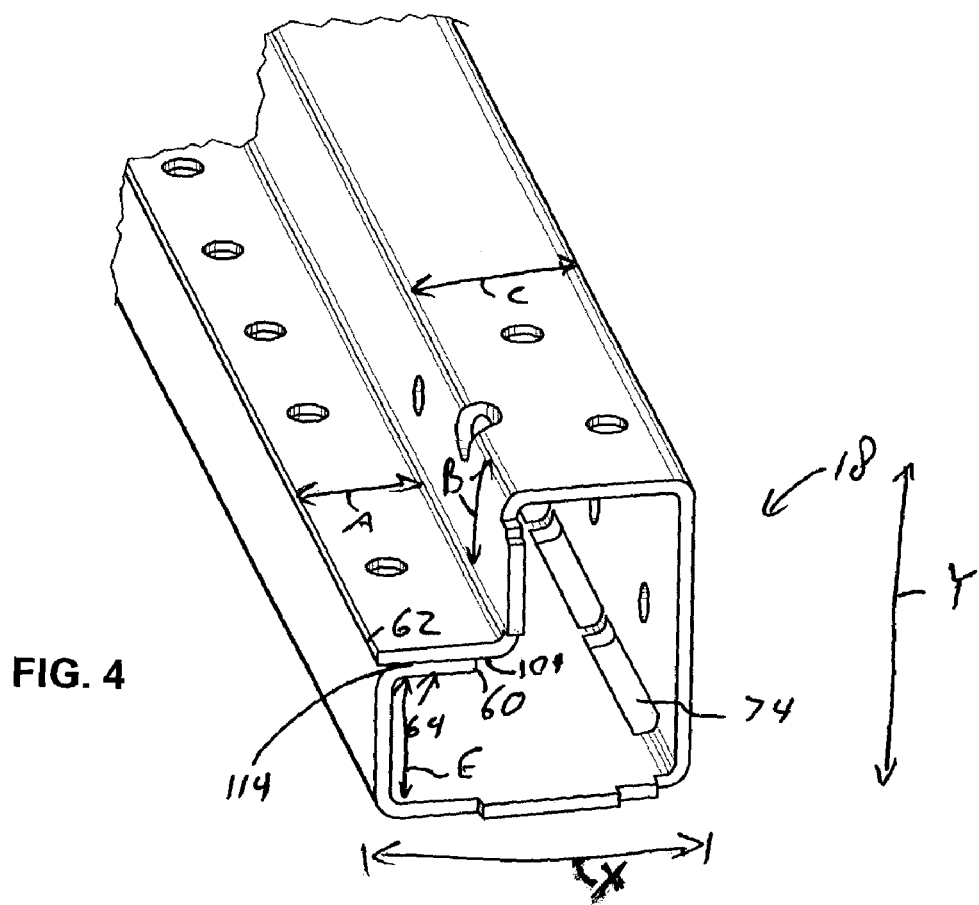
FIG. 4 is a perspective view of another post constructed in accordance with the present invention.

Shown in FIG. 4 is a fragmental, perspective view of one of the posts 18, constructed in accordance with the present invention. The post 18 is formed from a sheet 50, which is shown in FIG. 5. The sheet 50 is constructed of a malleable, bendable material, such as sheet metal. The sheet 50 has a first end 52 and an opposed second end 54. The first end 52 forms a lower portion 55 (FIG. 1) of the post 18 and the opposed second end 54 forms an upper portion 56 of the post 18. The sheet has a first side 60 and an opposed second side 62. The first and second sides, 60 and 62, extend generally between the first end 52 and the second end 54 of the sheet 50.

The sheet 50 is formed into a folded box section configuration wherein at least a portion of the first side 60 overlaps a portion of the second side 62 to provide an overlapping portion 64. The sheet 50 is preformed with a first series of holes 68 extending between the first end 52 and the second end 54 of the sheet 50. The sheet 50 is also preformed with a second series of holes 70, as well as a series of notches 74. The second series of holes 70 and the notches 74 extend between the first end 52 and the second end 54 of the sheet 50. The series of notches 74 are provided to assist in the final bending step used in forming the post 18. As shown in FIG. 4, the first and second series of holes 68 and 70 are located on the sheet 50 such that upon forming the sheet 50 into the folded box section configuration the first and second series of holes 68 and 70 are provided and aligned on the overlapping portion 64 of the sheet 50 so that the electronic equipment can be connected to the post 18 via the aligned first and second series of holes 68 and 70. The overlapping portion 64 of the fully formed box section corner post 18 provides a reinforced area for the ETSI equipment mounting centers.

As discussed above, the post 18 is desirably precisely located with respect to the lower panel 12a and upper panel 12b when the rack 10 is assembled. In one preferred embodiment, the post 18 is aligned with the lower and upper panels 12a and 12b by the tab 36 and corresponding slots 34 formed between the post 18 and lower and upper panels 12a and 12b.

The post 18 is also provided with various openings 76 and cutouts for connecting the post 18 to the lower panel 12a and the upper panel 12b.

Referring now to FIGS. 5–10, shown therein is one manufacturing process for constructing the post 18. However, it should be understood, that the post 18 may be formed by other processes.

The fronts posts 18 are of equal length and have an "L" shaped cross-section wherein the L comprises a horizontal dimension X and a vertical dimension Y. The sheet 50 includes a width W.

As shown in FIG. 5, the sheet 50 can be flat sheet metal. The flat sheet metal 50 is prepared with all of the holes, cutouts, and notches that the final corner post will require, preferably using hard press tooling. The formation of a box section then proceeds, for example, using a series of bending steps as illustrated in the sequence shown in FIGS. 6–10.

As shown in FIG. 6, a first bend 100 is formed in the sheet 50 a first distance A from the second side 62 by rotating the portion of the sheet 50 adjacent the second side 62 in a first direction 102. The first bend forms a first right angle and a first contact surface 104.

As shown in FIG. 7, a second bend 106 is formed in the sheet 50 at a distance B from the apex of the first bend 100. The second bend 106 is made by rotating the portion of the sheet 50 having the first bend 100 in a second direction 108. The second bend 106 forms a right angle.

As shown in FIG. 8, a third bend 110 at a distance C from the apex of the second bend 106 is formed by rotating the portion of the sheet 50 having the second bend 106 in the second direction 108. The third bend 110 forms a right angle.

As shown in FIG. 9, a fourth bend 112 at a distance D from the first edge 60 is formed by rotating a portion of the sheet 50 adjacent to the first side 60 in the second direction 108. The fourth bend 112 forms a right angle, and a second contact surface 114.

The sum of the distance A and the distance C about equals the dimension X. The sum of the distance C and the distance D also about equals the dimension X.

As shown in FIG. 10, a fifth bend 116 at a distance E from the apex of the fourth bend 112 is constructed by rotating the portion of the sheet 50 containing the fourth bend in the second direction 108. The fifth bend 116 is also a right angle. The sum of distances B and E about equals the dimension Y.

As shown in FIG. 4, the sheet 50 is then bent along the series of notches 74 until the first contact surface 104 engages the second contact surface 114 in a final step of forming the post 18.

The rack 10 is provided with modular construction and is typically configured for supporting electronic equipment 120, such as a server or telecom equipment. The rack 10 can be shipped when unassembled and then assembled on-site without any sacrifice of structural integrity or quality of the finally assembled rack 10. The rack 10 is typically supplied complete with front/rear doors, side panels, top and base plates, fan plate assembly, adjustable feet, grounding kit, depth members and adjustable mounting verticals. Other optional accessory parts, include plain/vented front panels, cable trays, chassis runners, sliding shelves, fixed shelves, front stabilizing foot, and castors.

The posts 18 having the folded box section construction also provide part of the means for mounting of ETSI Equipment. The posts 18, as well as the remaining components, are preferably formed from sheet metal using hard press tooling.

The precision location of the post 18 to the base/top panel/plate ensures consistently accurate placement and fixing of the frame structure. The folded box section construction gives the strength of a standard box section, but without the need to machine holes and cutout profiles on dedicated machines or use more expensive welding or extruding equipment. All holes and profiles are desirably generated while the sheet 50 is flat. The modular nature of the construction is also suitable for use with "flat pack" assemblies.

While presently preferred embodiments of the present invention have been described herein, one skilled in the art will recognize that many changes or alterations can be made to the preferred embodiments without departing from the spirit and scope of the present invention. It is therefore intended that all such modifications, alterations and other changes be encompassed by the claims.

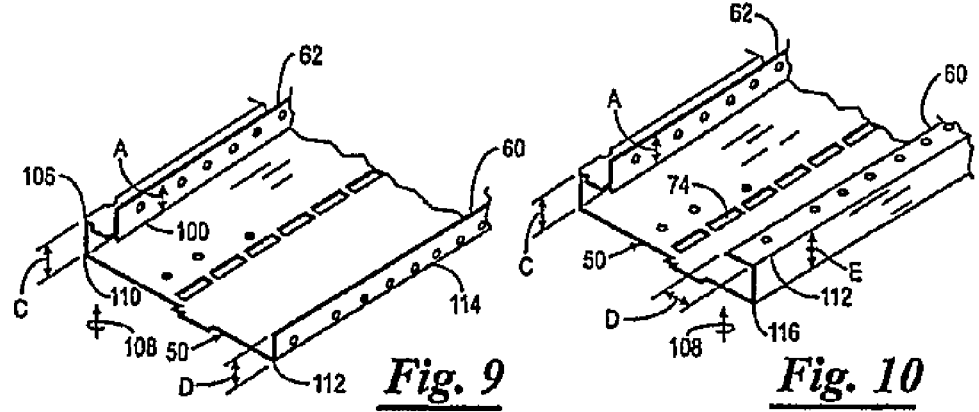

What is claimed is:

1. A post for a rack, the post comprising:
    a sheet constructed of a malleable, bendable material, the sheet having a first end and an opposed second end, the first end forming a lower portion of the post and the opposed second end forming an upper portion of the post, the sheet having a first side and an opposed second side with the first and second sides extending generally between the first end and the second end of the sheet, the sheet formed into a folded box section configuration wherein at least a portion of the first side overlaps a portion of the second side to provide an overlapping portion forming at least a portion of a perimeter of the folded box section configuration;
    wherein the sheet is pre-formed with a first series of holes extending between the lower portion of the sheet and the upper portion of the sheet and a second series of holes extending between the lower portion of the sheet and the upper portion of the sheet; and
    wherein the first and second series of holes are located on the sheet such that upon forming the sheet into the folded box section configuration the first and second series of holes are provided and aligned on the overlapping portion of the sheet.

2. The post of claim 1, wherein the sheet is bent into the folded box section configuration using hard press tooling.

3. The post of claim 1, further comprising means for precisely locating the first end and the second end of the sheet in the folded box section configuration with respect to a top panel or a base panel.

4. The post of claim 3, wherein the means for precisely locating the first end and the second end of the sheet in the folded box section includes at least one tab extending a distance from the first end of the sheet, and at least one tab extending from the second end of the sheet.

5. The post of claim 1, wherein the post is shaped and dimensioned for use in forming a European Telecommunication Standards Institute rack.

6. The post of claim 1, wherein the sheet further comprises a series of notches formed therein, the series of notches extending generally between the first side and the second side of the sheet, at least one of the bends utilized in forming the folded box section configuration being on the series of notches.

7. The post of claim 6, wherein the bend on the series of notches utilized in forming the folded box section configuration is the final bend.

8. A rack, comprising:
    a panel; and
    at least one post connected to the panel, the post constructed from a sheet of malleable, bendable material, the sheet having a first end and an opposed second end, the first end forming a lower portion of the post and the opposed second end forming an upper portion of the post, the sheet having a first side and an opposed second side with the first and second sides extending generally between the first end and the second end of the sheet, the sheet being formed to provide the post with a folded box section configuration wherein at least a portion of the first side overlaps a portion of the second side to provide an overlapping portion forming at least a portion of a perimeter of the folded box section configuration, wherein the sheet forming the post is pre-formed with a first series of holes extending between the lower portion of the sheet and the upper portion of the sheet and a a second series of holes extending between the lower portion of the sheet and the upper portion of the sheet, and wherein the first and second series of holes are located on the sheet such that upon forming the sheet into the folded box section configuration the first and second series of holes are provided and aligned on an overlapping portion of the sheet.

9. The rack of claim 8, wherein the sheet forming the post is bent into the folded box section configuration using hard press tooling.

10. The rack of claim 8, further comprising means for precisely locating the upper portion and the lower portion of the post in the folded box section configuration with respect to a top panel or a base panel.

11. The rack of claim 10, wherein the means for precisely locating the upper portion and lower portion of the post in the folded box section includes at least one tab extending from the upper portion of the post, and at least one tab extending from the lower portion of the post.

12. The rack of claim 8, wherein the post is shaped and dimensioned for use in forming a European Telecommunication Standards Institute rack.

13. The rack of claim 8, wherein the sheet forming the post further comprises a series of notches formed therein, the series of notches extending generally between the first side and the second side of the sheet, at least one of the bends utilized in forming the folded box section configuration being on the series of notches.

14. The rack of claim 13, wherein the bend on the series of notches utilized in forming the folded box section configuration is the final bend.

* * * * *

UNITED STATES PATENT AND TRADEMARK OFFICE
CERTIFICATE OF CORRECTION

PATENT NO.        : 6,974,036 B2
APPLICATION NO. : 10/403226
DATED             : December 13, 2005
INVENTOR(S)       : Brendan Wyatt and Barry Kleman It is certified that error appears in the above-identified patent and that said Letters Patent is hereby corrected as shown below:

The title page showing an illustrative figure(s) 1 should be deleted and substitute therefore the attached title page consisting of Fig(s) 1.

The drawing pages consisting of Fig(s) 1-10 should be deleted and substitute therefore the attached drawing pages 1-5 consisting of Fig(s) 1-10.

Signed and Sealed this

Twenty-fourth Day of April, 2007

JON W. DUDAS
*Director of the United States Patent and Trademark Office*

(12) United States Patent
Wyatt et al.

(10) Patent No.: US 6,974,036 B2
(45) Date of Patent: Dec. 13, 2005

(54) CORNER POST AND MANUFACTURING PROCESS FOR MAKING SAME

(75) Inventors: Brendan Wyatt, Shanghai (CN); Barry Kiernan, Shanghai (CN)

(73) Assignee: Vinsystems Group, Inc., St. Louis, MO (US)

(*) Notice: Subject to any disclaimer, the term of this patent is extended or adjusted under 35 U.S.C. 154(b) by 7 days.

(21) Appl. No.: 10/403,226

(22) Filed: Mar. 31, 2003

(65) Prior Publication Data
US 2004/0016713 A1 Jan. 29, 2004

Related U.S. Application Data

(60) Provisional application No. 60/369,215, filed on Apr. 1, 2002.

(51) Int. Cl.$^7$ .................................................. A47F 5/00
(52) U.S. Cl. ................................................ 211/26; 211/189
(58) Field of Search ...................... 211/26, 189, 175, 211/182, 183; 108/180, 182; 312/265.1, 312/265.4, 257.1

(56) References Cited

U.S. PATENT DOCUMENTS

| | | | |
|---|---|---|---|
| 3,620,588 A | 11/1971 | Ferdinand et al. | 312/323 |
| 4,045,104 A | 8/1977 | Peterson | 312/257 |
| 4,101,233 A * | 7/1978 | McConnell | 403/397 |
| 4,201,139 A * | 5/1980 | Suttles | 108/109 |
| 4,643,319 A * | 2/1987 | Debus et al. | 211/189 |
| 4,941,717 A | 7/1990 | Beaulieu | 312/265 |
| 4,988,008 A * | 1/1991 | Blum et al. | 211/189 |
| 4,997,240 A | 3/1991 | Schmalzl et al. | 312/265.4 |
| 5,014,487 A * | 5/1991 | King | 52/731.2 |
| 5,020,866 A | 6/1991 | McIlwraith | 312/265.4 |
| 5,052,565 A * | 10/1991 | Zachrai | 211/182 |
| 5,250,752 A | 10/1993 | Cutright | 174/35 R |
| 5,333,950 A * | 8/1994 | Zachrai | 312/265.1 |
| 5,372,262 A | 12/1994 | Benson et al. | 211/26 |
| 5,380,083 A | 1/1995 | Jones et al. | 312/265.3 |
| 5,647,650 A | 7/1997 | Dougherty et al. | 312/265.1 |
| 5,897,180 A | 4/1999 | Singer | 312/265.3 |
| 6,120,206 A | 9/2000 | Benner et al. | 403/231 |
| 6,126,022 A * | 10/2000 | Merkel | 211/135 |
| 6,168,249 B1 | 1/2001 | Chien | 312/265.4 |
| 6,231,142 B1 * | 5/2001 | Pochet | 312/265.3 |
| 6,238,029 B1 * | 5/2001 | Marzec et al. | 312/265.3 |
| 6,290,072 B1 * | 9/2001 | Utsumi et al. | 211/41.12 |
| 6,293,637 B1 * | 9/2001 | Anderson et al. | 312/265.1 |
| 6,502,702 B1 * | 1/2003 | Hsue et al. | 211/26 |
| 6,504,100 B2 * | 1/2003 | Lawrence et al. | 174/100 |
| 6,516,955 B1 * | 2/2003 | Dudhwala et al. | 211/26 |
| 6,719,150 B2 * | 4/2004 | Mattalfa | 211/49.1 |

* cited by examiner

*Primary Examiner*—David Purol
(74) *Attorney, Agent, or Firm*—Dunlap, Codding & Rogers, P.C.

(57) ABSTRACT

A post for a rack. The post is formed of a sheet constructed of a malleable, bendable material. The sheet has a first end and an opposed second end. The first end forms a lower portion of the post and the opposed second end forms an upper portion of the post. The sheet has a first side and an opposed second side with the first and second sides extending generally between the first end and the second end of the sheet. The sheet is formed into a folded box section configuration wherein at least a portion of the first side overlaps a portion of the second side to provide an overlapping portion. The post can be used for forming a European Telecommunications Standards Institute conforming rack.

14 Claims, 4 Drawing Sheets

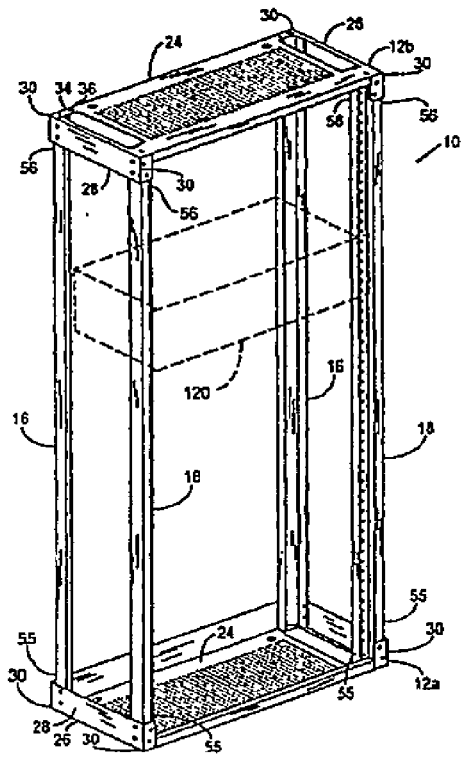

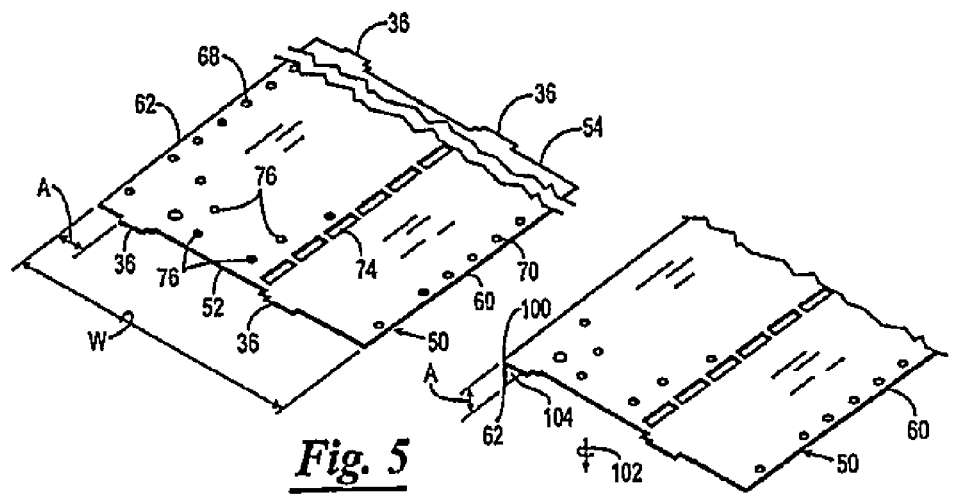
Fig. 5
Fig. 6
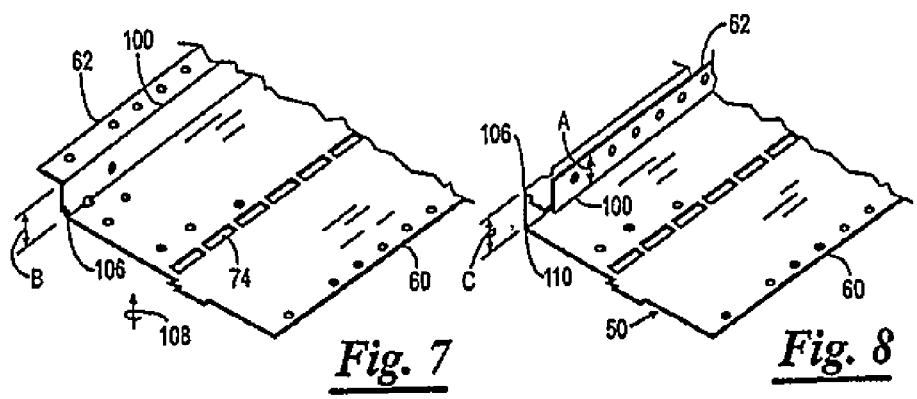
Fig. 7
Fig. 8